US006141226A

United States Patent [19]

Halvarsson et al.

[11] Patent Number: 6,141,226

[45] Date of Patent: Oct. 31, 2000

[54] HVDC TRANSMISSION SYSTEM WITH BIDIRECTIONALLY CONTROLLED THYRISTORS

[75] Inventors: Bruno Halvarsson, Ludvika; Lars Hermansson, Västerås, both of Sweden

[73] Assignee: ABB AB, Vasteras, Sweden

[21] Appl. No.: 09/445,510

[22] PCT Filed: May 27, 1998

[86] PCT No.: PCT/SE98/00995

§ 371 Date: Dec. 9, 1999

§ 102(e) Date: Dec. 9, 1999

[87] PCT Pub. No.: WO98/57409

PCT Pub. Date: Dec. 17, 1998

[30] Foreign Application Priority Data

Jun. 12, 1997 [SE] Sweden .................................. 9702248

[51] Int. Cl.[7] ........................................ H02J 3/36

[52] U.S. Cl. ........................................ 363/35; 363/51

[58] Field of Search ........................................ 363/35, 51

[56] References Cited

U.S. PATENT DOCUMENTS

| | | | |
|---|---|---|---|
| 3,883,790 | 5/1975 | Hammarlund et al. | 363/35 |
| 4,200,907 | 4/1980 | Hausler et al. | 363/51 |
| 4,419,591 | 12/1983 | Irokawa et al. | 363/35 |
| 4,459,492 | 7/1984 | Rogowsky | 363/35 |
| 5,414,612 | 5/1995 | Bjorklund et al. | 363/35 |
| 5,592,369 | 1/1997 | Bjorklund et al. | 363/51 |
| 5,751,563 | 5/1998 | Bjorklund et al. | 363/35 |
| 6,067,238 | 5/2000 | Halvarsson et al. | 363/35 |

*Primary Examiner*—Jeffrey Sterrett

*Attorney, Agent, or Firm*—Dykema Gossett PLLC

[57] ABSTRACT

A plant for transmitting electric power having a direct voltage network (18) for High Voltage Direct Current and at least one pole conductor interconnecting two stations (21, 22). In each station (21, 22), a bidirectionally controlled thyristor (BCT) conducts current in both directions as rectifying semiconductor components. A control unit (35) is adapted to control the current direction through the bidirectionally controlled thyristors so as to choose that the earth electrode (33, 34) of each station is always either anode or cathode.

5 Claims, 1 Drawing Sheet

1
2
3
4
5
6
7
8
9
10
11
12
13
14
15
16
17

18
19
20
21
22
23
24
25
26
27
28
29
30
31
32
33
34
35
CONTROL UNIT
POLE DROP OUT DETECTION

HVDC TRANSMISSION SYSTEM WITH BIDIRECTIONALLY CONTROLLED THYRISTORS

FIELD OF THE INVENTION AND PRIOR ART

The present invention relates to a plant for transmitting electric power comprising a direct voltage network for High Voltage Direct Current (HVDC) having at least one pole conductor extending between and interconnecting at least two stations with, for the pole conductor, a line commutated valve with thyristors as rectifying semiconductor components for transmitting electric power between the direct voltage network and alternating voltage networks connected to the stations, said pole conductor being at each station connected to an earth electrode.

The invention is in particular directed to the case of bipolar direct voltage networks having two pole conductors, and as a consequence thereof that case will be discussed more thoroughly hereinafter, but this is only done for illuminating the invention and the problems to be solved thereby and is not at all to be interpreted as limiting the invention, but this relates also to the case of a plant having only one pole conductor.

A plant already known having a direct voltage network 1 with two pole conductors 2, 3 extending between two stations 4, 5 and which are at each station provided with a valve each 6, 7 and 8, 9, respectively, for transmitting electric power between an alternating voltage network 14 and 15, respectively, connected to each station through transformers 10, 11 and 12, 13, respectively, is illustrated in FIG. 1. The two pole conductors are at each station connected to a common earth electrode 16 and 17, respectively. The valves are line commutated and have conventional thyristors with only one conducting direction as rectifying semiconductor components, which means that the current through each valve and by that in a given pole conductor only may assume a determined direction, so that the direction of the feeding of power between the stations only may be changed by changing the polarity of the pole conductors. Would now one of the pole conductors drop out, the plant would then become a plant having a unipolar direct voltage network with one pole conductor and an earth return circuit, in which in the case of the drop out of the pole conductor 3 the earth electrode 16 will become anode and the earth electrode 17 cathode, while on drop out of the pole conductor 2 the earth electrode 16 will become cathode and the earth electrode 17 anode. This means that the two earth electrodes have to be able to function both as anodes and cathodes should a plant be able to function after drop outs, since the earth electrodes on drop out of one pole conductor may assume one or the other type depending upon which of the poles drops out. However, the earth electrode is in certain cases depending upon the character of the ground not at all allowed to assume an optional polarity, which means that it will be necessary to either move the earth electrode in question or restrict the operation to only certain configurations. An earth electrode located in clay ground is for example not allowed to function as anode, since there is then a risk of explosions as a consequence of osmosis and gas formation, while it doesn't matter if a cathode is arranged in clay ground. However, an arrangement of an electrode in such a ground may not be considered for the plant already known, since it has to be able to assume an optional polarity. This means that it is necessary to locate the electrodes on such places that unnecessarily long lines or conductors are required. Furthermore, certain materials may not be used for the earth electrodes, such as copper, which is only suited as material for a cathode.

It may also be mentioned that in the case of a plant having from start only one pole conductor and an earth return circuit, in which accordingly each earth electrode is determined to always be either cathode or anode, would it be possible to later on discover that it would as a consequence of the ground conditions prevailing be advantageous that the earth electrodes had the opposite polarity, but it would then be necessary to move the earth electrodes to other places or rebuild the valves, so that the polarity of the electrodes would be changed, which would generate very high costs and delay the putting into operation of the plant, which in some cases would result in tremendous high delay penalties for the deliverer.

SUMMARY OF THE INVENTION

The object of the present invention is to provide a plant of the type defined in the introduction, which to a far extent find a remedy to the inconveniences mentioned above of already known such plants.

This object is according to the invention obtained by the fact that in such a plant at least a valve of one pole conductor in each station has bidirectionally controlled thyristors (BCT) with ability to conduct current in both directions therethrough as rectifying semiconductor components, and the plant comprises a control unit adapted to control the current direction through the bidirectionally controlled thyristors so as to make a choice that the earth electrode of each station shall be either anode or cathode.

This means that in the case of two pole conductors the current direction in the pole conductors of the direct voltage network may always be so that one earth electrode functions as anode and the other as cathode. Accordingly, it will be possible to always ensure that on drop out of one pole conductor the current in the remaining pole conductor flows from a certain of the stations to the other station, the earth electrode of which will always be anode.

The invention means in the case of only one pole conductor that it is possible when it is discovered after a certain operation time of the plant that the wrong earth electrode has been selected as anode and cathode, respectively, to simply reverse the current direction between the stations for carrying out a change of electrode type of each station.

According to a preferred embodiment of the invention the direct voltage network is bipolar with two said pole conductors, each of which is at each station provided with one said valve and the pole conductors are at each station in common connected to an earth electrode, and at least one pole conductor at each station has bidirectionally controlled thyristors (BCT) with ability to conduct current in both directions therethrough as rectifying semiconductor components.

The invention is especially applicable to the bipolar case, and it means a possibility to ensure that the earth electrode of a given station only has to function as either anode or cathode independently of which of the pole conductors of the direct voltage network has possibly dropped out, so that it is not necessary to consider the character of the ground where the earth electrode is arranged that much as if it could assume both polarities, and the choice of material for the electrode will neither be that critical. Copper may for example be used when it is sure that the electrode will always be a cathode.

According to another preferred embodiment of the invention, which constitutes a further development of the embodiment last mentioned, the control unit is adapted to control the valves of the plant so that on drop out of any of the pole conductors of the direct voltage network the current of the remaining pole conductor always flows in the same direction between the stations so that the earth electrode of the respective station will always be either anode or cathode. It is by this ensured that the advantages associated with the arrangement of the valves with bidirectionally controlled thyristors are utilised to an optimum.

According to a further preferred embodiment of the invention only one, first pole conductor has bidirectionally controlled thyristors in the valves thereof, while the valves of the second pole conductor are provided with thyristors having only one conducting direction, and the conducting direction of the thyristors in the valves of the second pole conductor is such that on drop out of the first pole conductor the current direction through the valves of the second pole conductor means that the earth electrodes of the stations assume a desired anode or cathode property. Thus, the current direction through the remaining pole conductor will in the case of a drop out of the pole conductor having valves provided with bidirectionally controlled thyristors be such that the earth electrodes receive the correct polarity, while on drop out of "the wrong" pole conductor, i.e. the one having valves with thyristors with only one conducting direction, the current direction has to be changed through the valves of the remaining pole conductor, which may easily be done thanks to the thyristors present therein through a temporary gradually reduction of the current through the pole conductor to zero, whereupon the current is then gradually increased again in the opposite direction, so that the polarity of the earth electrode is maintained.

Further advantages as well as advantageous features of the invention appear from the following description and the other dependent claims.

BRIEF DESCRIPTION OF THE DRAWING

With reference to the appended drawing, below follows a description of a preferred embodiment of the invention cited as an example.

In the drawing.

DETAILED DESCRIPTION OF A PREFERRED EMBODIMENT OF THE INVENTION

Figure 1:
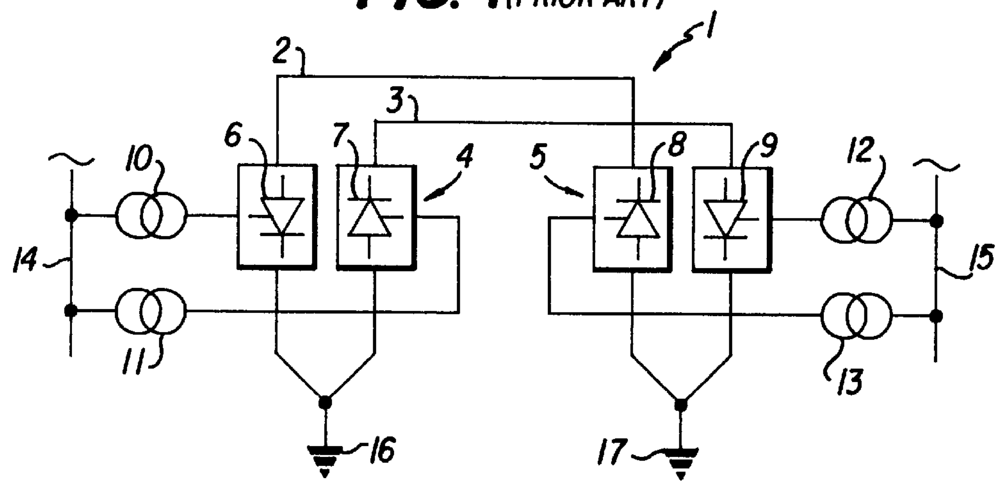
FIG. 1 is a very simplified circuit diagram illustrating a plant for transmitting electric power between two stations through a direct voltage network for High Voltage Direct Current (HVDC) according to the prior art.
Figure 2:
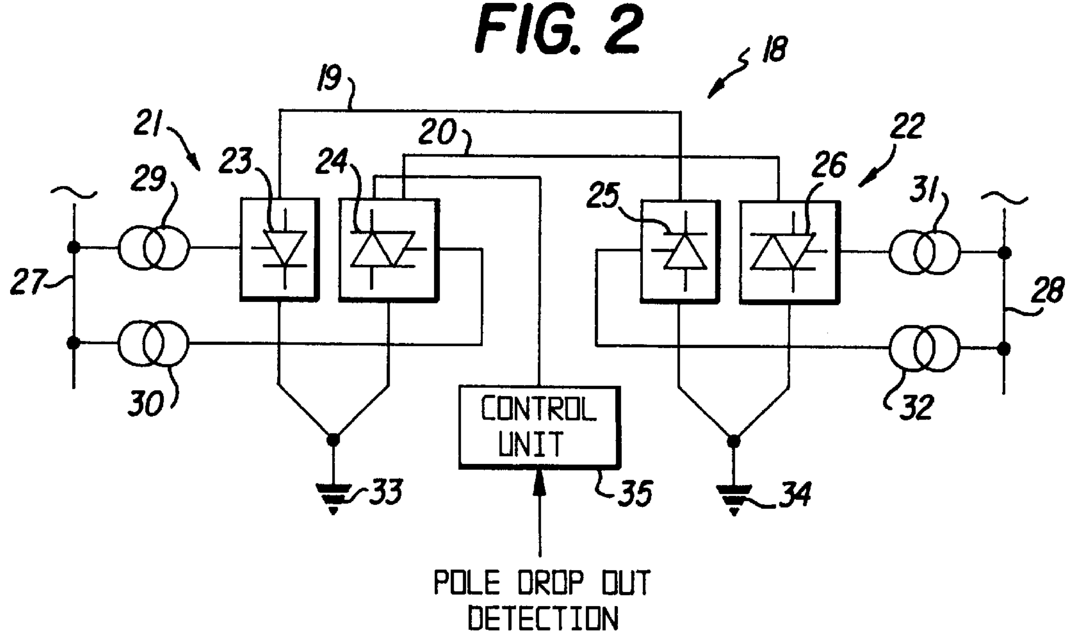
FIG. 2 illustrates a plant according to the present invention in a view corresponding to FIG. 1.

The structure of a plant according to a preferred embodiment of the invention for transmitting electric power, which comprises a direct voltage network 18 for High Voltage Direct Current (HVDC=High Voltage Direct Current) with two pole conductors 19, 20, which interconnects two stations 21, 22, is very schematically and simplified illustrated in FIG. 2. Each pole conductor has at each station a valve 23–26 each, which is connected to an alternating voltage network 27, 28 through a transformer 29–32. The pole conductors 19, 20, or expressed more exactly the two valves, are in each station connected in common to an earth electrode 33, 34.

The high voltage network 18 has typically a potential difference of 10–500 kV with respect to earth.

The respective valve is in a conventional way formed by for example so-called 12-pulse bridges, in which a number of rectifying semiconductor components in the form of thyristors are connected in series, since they in the turned-off state each can normally only hold 1–10 kV and the considerably higher voltage across the valve has to be distributed among the different thyristors.

The thyristors are in the valves 23 and 25 belonging to the one pole conductor 19 of conventional type, i.e. they and by this these valves may only conduct current in one direction therethrough, i.e. from the station 22 to the station 21.

However, the valves 24 and 26 of the second pole conductor 20 are designed in another way, by the fact that said thyristors are replaced by so-called BCTs (Bidirectionally Controlled Thyristors), i.e. bidirectionally controlled thyristors, which are made of two halves of one and the same disc connected in antiparallel to each other, so that through a unit 35 being for the sake of simplicity only indicated for the valve 24 these thyristors belonging to the valve may be controlled for selecting the current direction through the valve completely independently of the polarity existing of the pole conductor 20. The bidirectionally controlled thyristors are thyristors of the type described in for example DE 44 39 012 A1 and are sometimes called two-direction thyristors.

In normal operation of the plant the current flows from the station 22 to the station 21 through the pole conductor 19 and then back to the station 22 through the pole conductor 20. By choosing positive polarity for the pole conductor 19 and negative for the pole conductor 20 power may be fed from the station 22 to the station 21 on the direct voltage network, while the opposite feeding direction of power may be obtained through changing the polarity of the pole conductors.

It is decided in the present case that the earth electrode 33 shall always function as anode and the earth electrode 34 as cathode. Would now the pole conductor 20 drop out, so that a change to unipolar operation with earth return circuit takes place, the current would then flow through the pole conductor 19 from the station 22 to the station 21 and then back through the anode 33 to the cathode 34. However, would the pole conductor 19 drop out, the current in the pole conductor 20 has then for the moment the wrong direction, and as a consequence thereof the control unit 35 controls the two valves 24 and 26 to gradually reduce the current to zero, whereupon a current direction change order is given and the current is after that gradually increased to the desired level, so that it will flow from the station 22 to the station 21 in the pole conductor 20 and by that the earth electrode 33 will be anode and the earth electrode 34 cathode.

The invention is of course not in any way restricted to the preferred embodiment described above, but many possibilities to modifications thereof would be apparent to a man skilled in the art without departing from the basic idea of the invention such as it appears from the claims.

For example in a bipolar plant all the valves could be provided with bidirectionally controlled thyristors as rectifying semiconductor components, although it is not necessary for ensuring that the earth electrode polarity is always the same.

It is also conceivable that the plant has more than two stations.

The claim definition that the pole conductor is at each station connected to an earth electrode is not to interpreted as a requirement that it is directly connected thereto, but it is instead so that at least a valve of the pole conductor is connected therebetween.

What is claimed is:

1. A plant for transmitting electric power comprising a direct voltage network for High Voltage Direct Current (HVDC) having at least one pole conductor extending between and interconnecting at least two stations with, for the pole conductor, a line commutated valve with thyristors as rectifying semiconductor components for transmitting electric power between the direct voltage network and alternating voltage networks connected to the stations, said pole conductor being at each station connected to an earth electrode, wherein a valve of at least one pole conductor in each station includes bidirectionally controlled thyristors (BCT) for conducting current in both directions therethrough as rectifying semiconductor components, and the plant comprises a control unit for controlling the current direction through the bidirectionally controlled thyristors so as to make a choice that the earth electrode of each station shall be either anode or cathode.

2. A plant according to claim 1, in which the direct voltage network is bipolar with two said conductors, each of which at each station being provided with one said valve and the pole conductors being commonly connected at each station to an earth electrode, wherein the valve of at least one pole conductor at each station has bidirectionally controlled thyristors (BCT) for conducting current in both directions therethrough as rectifying semiconductor components.

3. A plant according to claim 2, wherein the control unit is adapted to control the valves of the plant so that on drop out of any of the pole conductors of the direct voltage network the current of the remaining pole conductor always closes in the same direction between the stations so that an earth electrode of the respective station will always be either anode or cathode.

4. A plant according to claim 3, wherein only a first of the pole conductors has bidirectionally controlled thyristors in the valves thereof, while the valves of the second pole conductor are provided with thyristors having only one conducting direction, and the conducting direction of the thyristors in the valves of the second pole conductor is such that on drop out of the first pole conductor the current direction through the valves of the second pole conductor means that the earth electrodes of the stations assume a desired anode or cathode property.

5. A plant according to claim 1, comprising two stations.

* * * * *